United States Patent
Falk et al.

(10) Patent No.: US 8,533,471 B2
(45) Date of Patent: Sep. 10, 2013

(54) METHOD AND SERVER FOR PROVIDING MOBILITY KEY

(75) Inventors: Rainer Falk, Eching (DE); Dirk Kröselberg, München (DE); Maximilian Riegel, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 828 days.

(21) Appl. No.: 12/092,690

(22) PCT Filed: Oct. 27, 2006

(86) PCT No.: PCT/EP2006/067895
§ 371 (c)(1),
(2), (4) Date: May 5, 2008

(87) PCT Pub. No.: WO2007/051768
PCT Pub. Date: May 10, 2007

(65) Prior Publication Data
US 2008/0270794 A1 Oct. 30, 2008

(30) Foreign Application Priority Data

Nov. 4, 2005 (DE) .......................... 10 2005 052 718
Feb. 2, 2006 (DE) .......................... 10 2006 004 868

(51) Int. Cl.
*H04L 9/32* (2006.01)
(52) U.S. Cl.
USPC .......................... 713/168; 380/270; 370/331
(58) Field of Classification Search
None
See application file for complete search history.

(56) References Cited

U.S. PATENT DOCUMENTS

| 7,313,394 | B2 * | 12/2007 | Bakshi ..................... 455/432.1 |
| 7,475,241 | B2 * | 1/2009 | Patel et al. .................. 713/155 |
| 2003/0090998 | A1 | 5/2003 | Lee et al. |
| 2006/0182061 | A1 * | 8/2006 | Naghian .................... 370/331 |
| 2007/0091843 | A1 * | 4/2007 | Patel et al. .................. 370/331 |

FOREIGN PATENT DOCUMENTS

| KR | 2003-0040601 | 5/2003 |
| WO | 2007/011995 A1 | 1/2007 |

OTHER PUBLICATIONS

EAP based proxy mobile IP key bootraping for WIMAX, Nakhjiri et al, published Jan. 2005.*
EAP based proxy mobile IP key bootraping for WIMAX, Nakhjiri et al, PUblished Jan. 2005.*

(Continued)

*Primary Examiner* — Fikremariam A Yalew
(74) *Attorney, Agent, or Firm* — Staas & Halsey LLP

(57) ABSTRACT

After a radio link is established between a mobile subscriber terminal and an access network, to authenticate the subscriber an authentication proxy server of an intermediate network forwards at least one authentication message containing a subscriber identification between the access network and a home network of the subscriber. If authentication is given by an authentication server of the home network, the authentication proxy server of the intermediate network stores the subscriber identification. The home agent receives a registration request message originating from the subscriber terminal and containing a subscriber identification; the home agent transmits a key request message, containing the subscriber identification, for a mobile key to the relevant authentication proxy server. The authentication proxy server provides a mobile key for the home agent, if the subscriber identification contained in the key request message matches one of the subscriber identifications that has been stored by the authentication proxy server.

27 Claims, 7 Drawing Sheets

(56) References Cited

OTHER PUBLICATIONS

D. Kim et al.; "Architecture for 3G and 802.16 Wireless Networks Integration with QoS Support"; Proceedings of the 2nd Int'l Conf. on Quality of Service in Heterogeneous Wired/Wireless Networks; IEEE Computer Society; Aug. 2005; 8 pp.

Part 16: Air Interface for Fixed and Mobile Broadband Wireless Access Systems; Amendments for Physical and Medium Access Control Layers for Combined Fixed and Mobile Operation in Licensed Bands; Draft IEEE Standard P802.16e/D11; Sep. 2005; pp. i-xxvii, 1-658.

Part 16: Air Interface for Fixed Broadband Wireless Access Systems; IEEE Standard 802.16/2001; 2001; pp. i-xxvii, 1-184.

M. Nakhjiri et al.; "EAP Based Proxy Mobile IP Key Bootstrapping for WiMax"; Internet Engineering Task Force Standard-Working-Draft; Jan. 2005; pp. 1-10.

C. Perkins, ed.; "IP Mobility Support"; Network Working Group; RFC 2002; Oct. 1996; pp. 1-71.

"cdma2000 Wireless IP Network Standard: Simple IP and Mobile IP Services"; 3GPP2 X.S0011-002C; Version 2.0; 3rd Generation Partnership Project 2; Jul. 2005; pp. i-iii, 1-42.

"WiMax End-to-End Network Systems Architecture (Stage 2: Architecture Tenets, Reference Model and Reference Points)"; WiMax Forum; Sep. 2005 DRAFT; pp. i-xiii, 1-249.

3rd Generation Partnership Project; Technical Specification Group Service and System Aspects; 3G Security; WLAN Interworking Security; (Release 6); 3GPP TS 33.234 V0.6.0; Sep. 2003; pp. 1-47.

3rd Generation Partnership Project; Technical Specification Group Service and System Aspects; 3GPP system to Wireless Local Araea Network (WLAN) interworking; System description (Release 6); 3GPP TS 23.234 V6.6.0; Sep. 2005; 80 pp.

S. Glass et al. "Mobile IP Authentication, Authorization, and Accounting Requirements";Network Working Group; RFC 2977;Oct. 2000; pp. 1-27.

C. Perkins, Ed.; "IP Mobility Support for IPv4"; Network Working Group; RFC 3344; Aug. 2002; pp. 1-99.

B. Aboba et al.; "Extensible Authentication Protocol (EAP)"; Network Working Group; RFC 3748; Jun. 2004; pp. 1-67.

F. Johansson et al.; "Mobile IPv4 Extension for Carrying Network Access Identifiers"; Network Working Group; RFC 3846; Jun. 2004; pp. 1-8.

C. Perkins et al.; "Authentication, Authorization, and Accounting (AAA) Registration Keys for Mobile IPv4"; Network Working Group; RFC 3957; Mar. 2005; pp. 1-27.

A. Patel et al.; "Authentication Protocol for Mobile IPv6"; Network Working Group; RFC 4285; Jan. 2006; pp. 1-19.

D. Johnson et al.; "Mobility Support in IPv6"; Network Working Group; RFC 3775; Jun. 2004; pp. 1-165.

J. Arkko et al.; "Using IPsec to Protect Mobile IPv6 Signaling Between Mobile Nodes and Home Agents"; Network Working Group; RFC 3776; Jun. 2004; pp. 1-40.

International Search Report for Application No. PCT/EP2006/067895; mailed Mar. 6, 2007.

* cited by examiner

FIG 1
Prior art

Mobility binding table

| Home Address | Care-of-Address | Lifetime (ms) |
|---|---|---|
| 131.192.180.42 | 129.142.23.42 | 100 |
| 213.123.24.140 | 172.23.142.49 | 150 |
| ... | ... | ... |

FIG 2
Prior art

Visitor list

| Home Address | Home Agent Address | Media Address | Lifetime |
|---|---|---|---|
| 131.192.180.42 | 129.142.23.42 | 08-00-46-26-75-6A | 100 |
| 213.123.24.140 | 172.23.142.49 | 00-02-B3-77-43-00 | 150 |
| ... | ... | ... | ... |

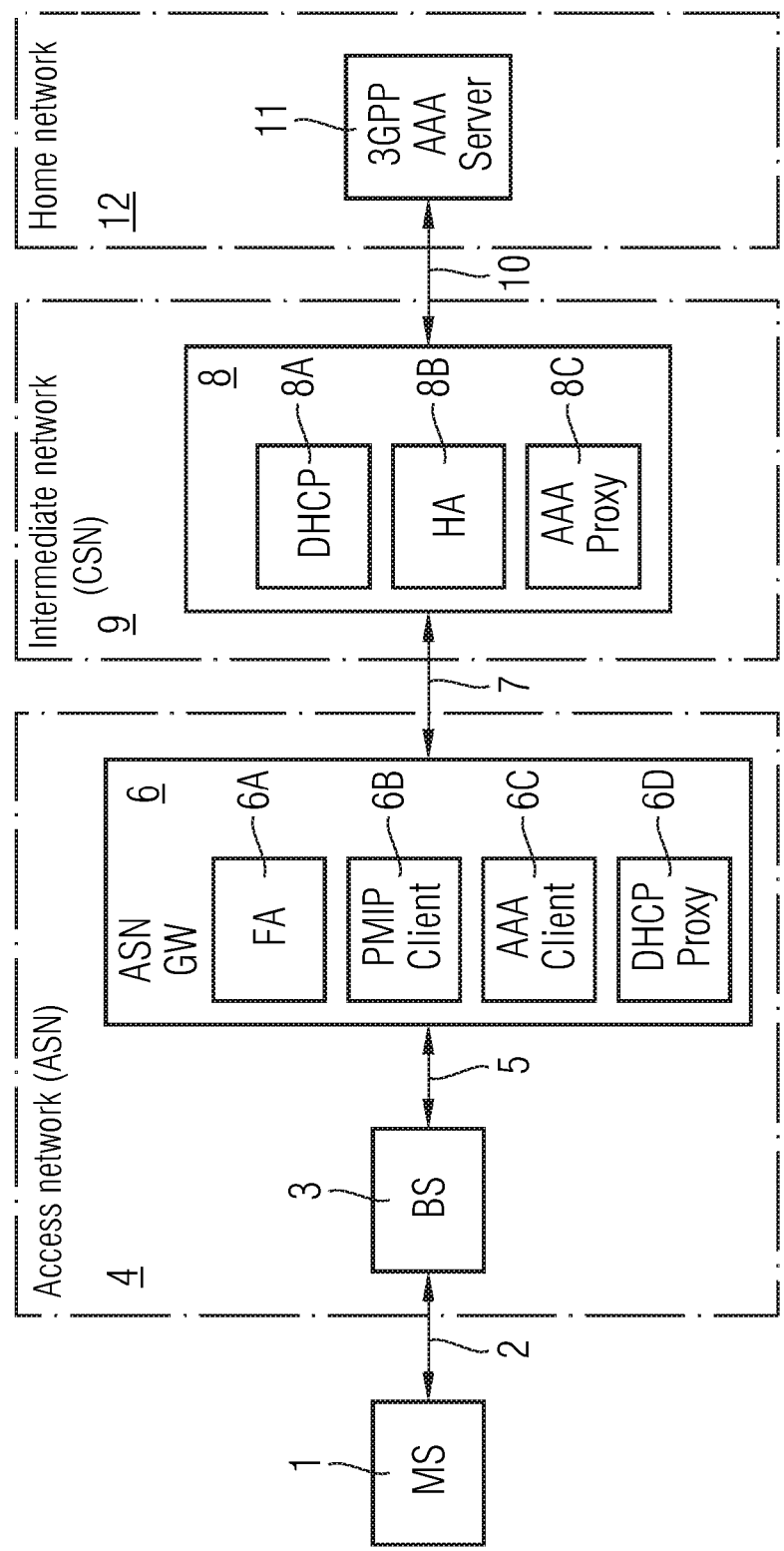

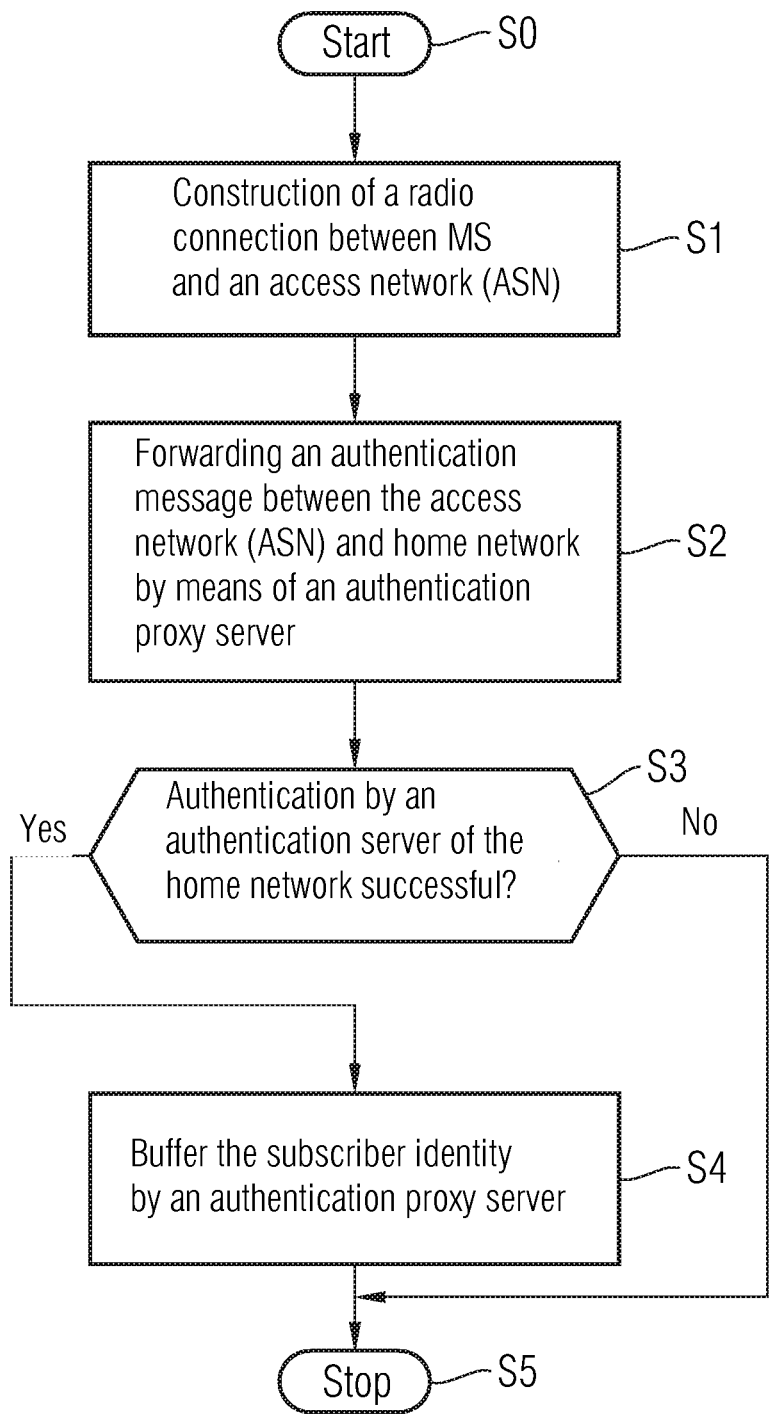

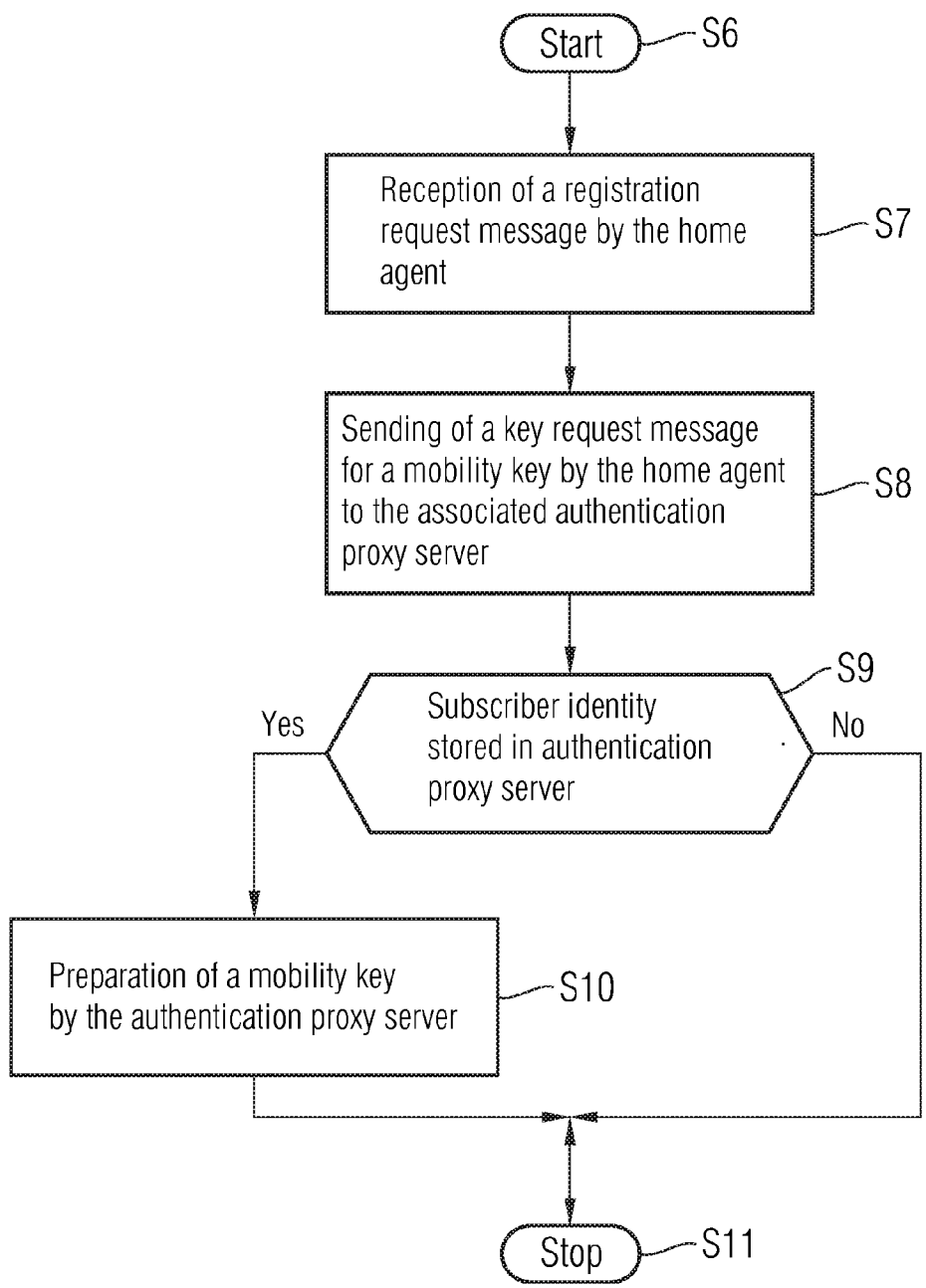

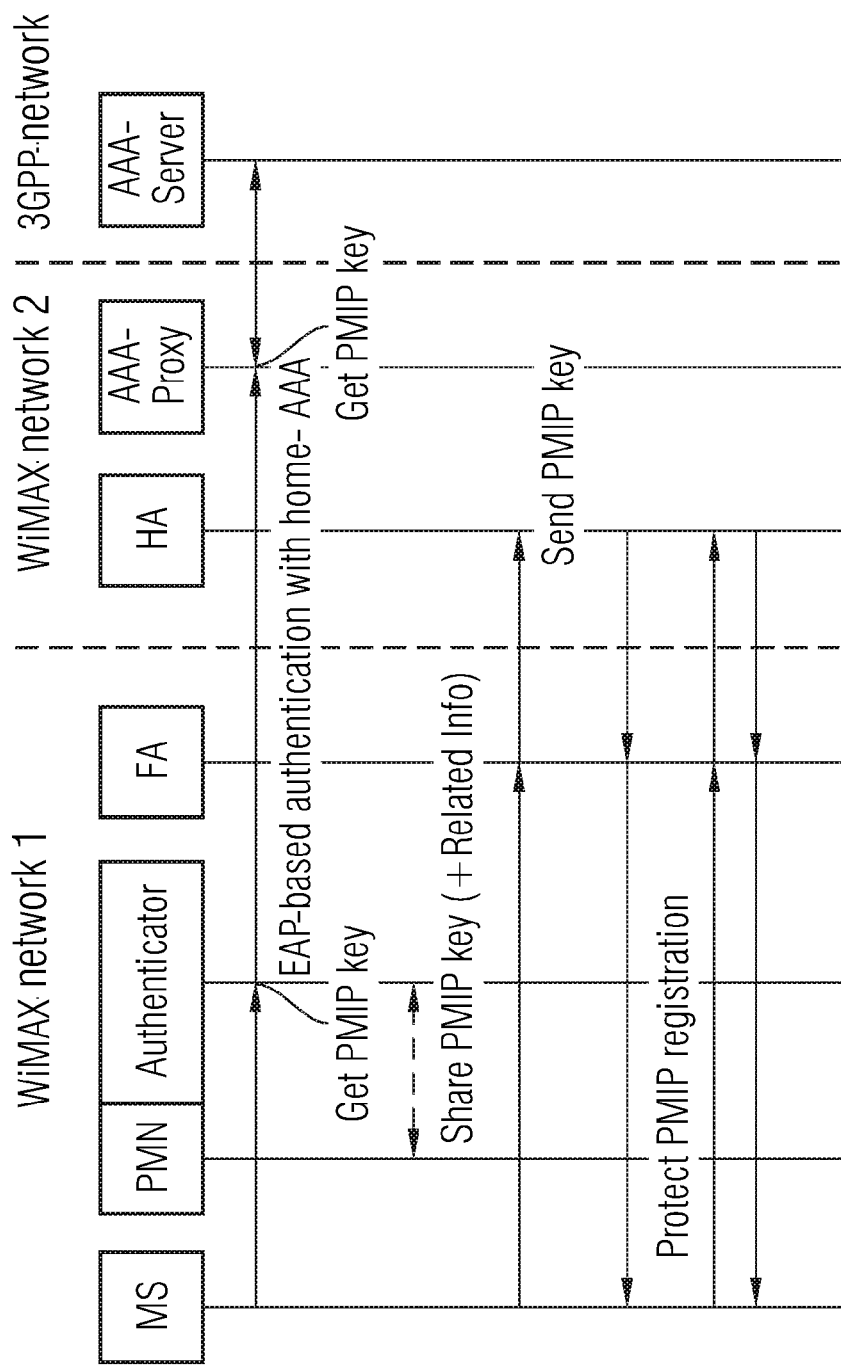

METHOD AND SERVER FOR PROVIDING MOBILITY KEY

CROSS REFERENCE TO RELATED APPLICATIONS

This application is based on and hereby claims priority to German Application No. 10 2005 052 718.3 filed on Nov. 4, 2005 and German Application No. 10 2006 004 868.7 filed on Feb. 2, 2006, the contents of which are hereby incorporated by reference.

BACKGROUND

Described below is a method and a proxy server for the provision of a mobility key for cryptographic securing of mobility signaling messages for a home agent of a mobile network.

Internet with TCP/IP protocol offers a platform for the development of higher protocols for the mobile sector. As the internet protocols are widespread, a large circle of users can be reached with corresponding protocol extensions for mobile environments. The internet protocols were, however, not originally conceived for mobile use. In conventional internet packet switching, the packets are exchanged between stationary computers which neither change their network addresses nor move between different subnets. In radio networks with mobile computers, mobile computers MS are often integrated into different networks. The DHCP (Dynamic Host Configuration Protocol) enables dynamic allocation of an IP address and further configuration parameters to a computer in a network with the help of a corresponding server. A computer which is integrated into a network automatically receives a free IP address through the DHCP protocol. If a mobile computer has DHCP installed then it simply has to come into the range of a local network which supports the configuration over the DHCP protocol. Dynamic address allocation is possible in the DHCP protocol, i.e. a free IP address is automatically allocated for a specific time. After this time has finished, the request from the mobile computer must either be refreshed or the IP address can be otherwise assigned.

With DHCP, a mobile computer can be integrated into a network without manual configuration. The only requirement is that a DHCP server be available. In this way a mobile computer can use local network services and, for example, use files stored centrally. However, if a mobile computer offers services itself, then a potential service user cannot locate the mobile computer, as the IP address of this computer is changed in every network into which the mobile computer is integrated. The same thing happens whenever an IP address changes during an existing TCP connection. This leads to an interruption in the connection. For this reason, in mobile IP a mobile computer is allocated an IP address which it still retains in another network. In conventional IP network switching it is necessary to adapt the IP address settings correspondingly. A constant adaptation of IP and routing configurations to the end device is, however, almost impossible. In the conventional automatic configuration mechanisms, the existing connection is interrupted upon a change to the IP addresses. The mobile Internet protocol (MIP) protocol (RFC 2002, RFC 2977, RFC3344, RFC3846, RFC3957, RFC3775, RFC3776, RFC4285) supports the mobility of mobile end devices. In the conventional IP protocols, the mobile end device has to adapt its IP address every time it changes IP subnet, in order that the data packets addressed to the mobile end device are correctly routed. In order to hold up an existing TCP connection, the mobile end device has to retain its IP address, as a change of address leads to interruption of the connection. The MIP protocol removes this conflict in that it allows a mobile end device or a mobile node (MN) to have two IP addresses. The MIP protocol enables a transparent connection between the two addresses, namely a permanent home address and a second temporary care-of address. The care-of address is the IP address under which the mobile end device can currently be reached.

A home agent is a representative of the mobile end device as long as the mobile end device remains in the original home network. The home agent is constantly informed about the current whereabouts of the mobile computer. The home agent typically constitutes a component of a router on the home network of the mobile end device. Whenever the mobile end device is located outside the home network, the home agent provides a function such that the mobile end device can log on. Then, the home agent forwards the data packets addressed to the mobile end device into the current subnet of the mobile end device.

A foreign agent is located in the subnet in which the mobile end device moves. The foreign agent forwards incoming data packets on to the mobile end device, i.e. on to the mobile computer. The foreign agent is located in a so-called visited network. The foreign agent likewise typically represents a component of a router. The foreign agent routes all administrative mobile data packets between the mobile end device and its home agents. The foreign agent unpacks the IP data packets sent tunneled from the home agent, and forwards their data on to the mobile end device.

The home address of the mobile end device is the address at which the mobile end device can be permanently reached. The home address has the same address prefix as the home agent. The care-of address is the IP address which the IP end device uses in the foreign network.

The home agent administers a so-called mobility binding table (MBT). The entries in this table serve to allocate both addresses of a mobile end device, i.e. the home address and the care-of address, to each other, and to divert the data packets correspondingly. The MBT table contains entries about the home address, the care-of address and an entry about the span of time in which this allocation is valid (lifetime). FIG. 1 shows an example for a mobility binding table according to the related art.

The foreign agent (FA) contains a visitor list (VL) containing information about the mobile end devices which are currently located in the IP network of the foreign agent. FIG. 2 shows an example for such a visitor list according to the related art.

In order that a mobile computer can be integrated into the network, it must first learn whether it is located in its home or a visited network. In addition, the mobile end device must learn which computer in the subnet is the home or the foreign agent. These items of information are detected by so-called Agent Discovery.

The mobile end device can inform its home agents of its current location through the subsequent registration. To this end the mobile computer or the mobile end device sends the current care-of address to the home agents. The mobile computer sends a registration request to the home agents for registration. The home agent (HA) records the care-of address in its list and answers with a registration reply. At this juncture, however, there is a security problem. As, in principle, every computer can send a registration request to a home agent, it would be easy to give a home agent the false impression that a computer had moved into another network. In this way a foreign computer could take on all the data packets of a mobile computer or mobile end device without a sender knowing anything about it. In order to prevent this, the mobile computer and the home agent have a common secret key at their disposal. Should a mobile computer return into its home network then it is deregistered with the home agents, as from now on the mobile computer can accept all data packets itself. A mobile network must feature the following security measures, among others. Information may only be made accessible to desired communication partners, i.e. undesired eavesdroppers may not have access to transmitted data. The mobile network must therefore have a confidentiality capacity. Alongside this, authenticity must be given. The authenticity allows a communication partner to establish without doubt whether a communication was actually established with a desired communication partner or whether a foreign party is impersonating a communication partner. Authentications can be carried out per message or per connection. If authentication is carried on the basis of connections, then the communication partner is identified only once at the start of a session. For the further course of the session, it is then assumed that the following messages continue to originate from the corresponding sender. Even if the identity of a communication partner is established, the situation can arise that this communication partner may not gain access to all resources, or is not allowed to use all services on the network. In this case, a corresponding authorization requires a previous authentication of the communication partner.

In mobile data networks, messages must travel long stretches over air interfaces and so can easily be obtained by potential attackers. Security aspects therefore play a special role in mobile and wireless data networks. Encryption techniques constitute an essential way of raising the security in data networks. By encryption it is possible to transmit data over insecure communication channels, for example over air interfaces, without unauthorized third parties gaining access to the data. For encryption, the data, i.e. the so-called clear text, are transformed into cipher-text with the help of an encryption algorithm. The encrypted text can be transported over the insecure data transmission channel and subsequently decrypted or deciphered.

WiMax (Worldwide Interoperability for Microwave Access) is being suggested as the new standard for a very promising wireless access technology, which is used for the radio transmission IEEE 802.16. With WiMax, an area of up to 50 km should be supplied with over 100 Mbit per second by transmitting stations.

FIG. 3 shows a reference model for a WiMax radio network. A mobile end device MS is located in the region of an access network (ASN: Access Serving Network). The access network ASN is connected to a home network HCSN (Home Connectivity Service Network) by at least one visited network (Visited Connectivity Service Network VCSN). The various networks are connected with each other by interfaces or reference points R. The home agent HA of the mobile station MS is located in the home network HCSN or in one of the visited networks VCSN.

WiMax supports two implementation variants of mobile IP, so-called client MIP (CMIP), in which the mobile station itself implements the MIP client function, and proxy MIP (PMIP), in which the MIP client function is implemented by the WiMax access network. The functionality intended for this in the ASN is labeled proxy mobile node (PMN) or PMIP client. MIP can thereby be used with mobile stations which themselves do not support an MIP.

FIG. 4 shows the connection establishment in proxy MIP whenever the home agent is located in the visited network according to the related art.

After construction of a radio link between the mobile end device and a base station, there first takes place an access authentication. The functioning of the authentication, the authorization and the bookkeeping is carried out by so-called AAA servers (AAA: Authentication, Authorization and Accounting). Authentication messages are exchanged between the mobile end device MS and the AAA server of the home network (HAAA), by which the address of the home agents and an authentication key are obtained. The authentication server in the home network contains the profile data of the subscribers. The AAA server obtains an authentication request message, which contains a subscriber's identity of the mobile end device. After successful access authentication, the AAA sever generates an MSK key (MSK: Master Session Key) to protect the data transmission lines between the mobile end device MS and the base stations of the access network ASN. This MSK key is transmitted by the AAA server of the home network over the intermediate network CSN to the access network ASN.

After the access authentication the DHCP proxy server in the access network ASN is configured, as can be seen in FIG. 4. Should the IP address and host configuration already be contained in the AAA answer message, then the total information is downloaded into the DHCP proxy server.

After successful authentication and authorization, the mobile station or the mobile end device MS sends a DHCP discovery message and an IP address allocation is carried out.

Should the access network ASN support both PMIP and CMIP mobility, then the foreign agent informs the ASN handover function in that it sends a R3 mobility context message. There is dispensed with in networks which only support PMIP. After the home address has been read out, this is forwarded on to the PMIP client.

Subsequently an MIP registration takes place. In the registration, the home agent is informed about the current location of the mobile end device. For registration, the mobile computer sends the registration request to the home agent which contains the current care-of address. The home agent carries the care-of address in a list managed by it and answers with a registration reply. As, in principle, every computer can send registration requests to a home agent, a home agent could easily be made to believe that a computer had moved into another network. In order to prevent this, both the mobile computer and the home agent have access to a common secret key, namely an MIP key. Should the home agent (HA) not know the MIP key, it sets it up, for which it communicates with a home AAA server.

After completion of the connection establishment depicted in FIG. 4, the mobile end device has obtained a home address and is registered with the home agents.

The connection establishment depicted in FIG. 4 is impossible, though, if the home AAA server does not deliver the attributes or data expected by the WiMax protocol. If this concerns a home AAA server which is a 3GPP server or some other AAA server which does not support WiMax interworking, then it is not in a position to provide the data attributes necessary for the MIP registration, in particular the home address and a cryptographic key. So the home agent HA obtains no MIP key (MSK: Master Session Key) and rejects the subscriber.

SUMMARY

An aspect is a method for the provision of a mobility key for a mobile network in which the authentication servers of the home network do not support MIP registration.

The method for the production of at least one mobility key for the cryptographic securing of mobility signaling messages for a home agent, with the following steps:

Construction of a radio connection between a mobile subscriber end device and an access network, with an authentication proxy server of an intermediate subscriber for authenticating the subscriber forwarding at least one authentication message containing a subscriber identity between the access network and a subscriber's home network, and saves the subscriber's identity upon successful authentication by an authentication server of the home network;

Reception of a registration request message containing a subscriber's identity and originating from a subscriber end device, through the home agent;

Sending of a key request message for a mobility key by the home agent to the dedicated authentication proxy server, with the key request message containing the subscriber identity contained in the registration request message; and Preparation of a mobility key by the authentication proxy server for the home agent, if the subscriber identity contained in the key request message is consistent with one of the subscriber identities saved by the authentication proxy server.

In an embodiment, the mobility key is randomly generated by the authentication proxy server.

In embodiment, upon successful authentication, the authentication server of the home network transmits an MSK key contained in an authentication message via the authentication proxy server to an authentication client of the access network.

In an alternative embodiment, the mobility key is not generated randomly by the authentication proxy server, but rather derived by the authentication proxy server from the transmitted MSK key.

In an embodiment, the mobility key forms a part of the transmitted MSK key.

In an alternative embodiment, the mobility key is identical to the transmitted MSK key.

In an embodiment, the authentication messages are transmitted according to a radius data transmission protocol.

In an alternative embodiment, the authentication messages are transmitted according to a diameter data transmission protocol.

In an embodiment, the access network is formed by a WiMax access network ASN.

In an embodiment, the intermediate network is formed by a WiMax intermediate network CSN.

In a first embodiment, the home network is a 3GPP network.

In an alternative embodiment, the home network is made up of a network which prepares an AAA infrastructure for WLAN subscribers (WLAN-net).

In an embodiment, the subscriber identity is formed by a network access identifier NAI.

In an alternative embodiment, the subscriber identity is formed by a home address of the subscriber.

In an embodiment, the mobility key is additionally provided with a PMIP client of the access network.

In an embodiment there are several intermediate networks between the access network and the home network.

In a first embodiment there is a home agent in the home network.

In an alternative embodiment the home agent is in one of the intermediate networks.

In a first embodiment, the authentication proxy server is allotted in the home network.

In an alternative embodiment, the authentication proxy server in allotted in one of the intermediate networks.

The invention furthermore creates an authentication proxy server for the preparation of a mobility key for cryptographic securing of mobility signaling messages, such that the authentication proxy server saves the subscriber identity after every successful authentication of a subscriber, and prepares a mobility key after receiving a key request message for a mobility key from a home agent, if a subscriber identity contained in the key request message is consistent with one of the saved subscriber identities.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 is an example of a mobility binding table in the related art;

FIG. 2 is an example of a visitor list according to the related art;

FIG. 5 is a block diagram of a network structure according to an embodiment of the method according to the invention;

FIG. 6 is a flowchart to explain the functionality of the method according to the invention;

FIG. 7 is a further flowchart to explain the functionality of the method according to the invention;

FIG. 8 is a signal diagram to explain the functionality of the method according to the invention.

DETAILED DESCRIPTION OF THE PREFERRED EMBODIMENT

Figure 3:
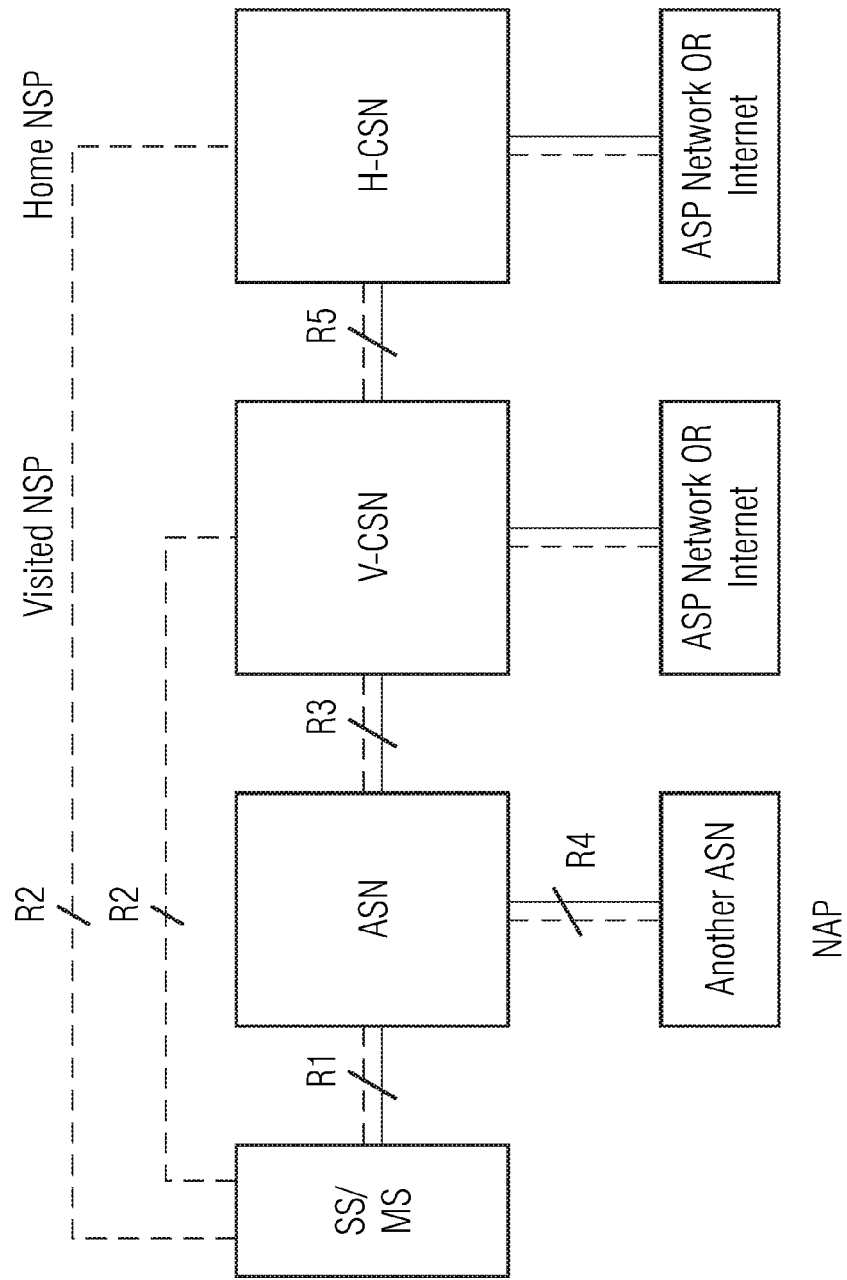
FIG. 3 is a block diagram of a reference network structure for a WiMax radio network.

Reference will now be made in detail to the preferred embodiments, examples of which are illustrated in the accompanying drawings, wherein like reference numerals refer to like elements throughout.

As can be seen from FIG. 5, a mobile end device 1 is connected to a base station 3 of an access network 4 by way of a wireless interface 2. The mobile end device 1 concerns any type of mobile end device, for example a laptop, a PDA, a mobile telephone or another mobile end device. The base station 3 of the access network 4 is connected by a data transmission line 5 to an access network gateway 6. Further functionalities are advantageously integrated into the access gateway computer 6, in particular a foreign agent 6A, a PMIP client 6B, an AAA client server 6C and a DHCP proxy server 6D. The foreign agent 6A is a router which provides routing services to the mobile end device 1. The data packets sent to the mobile end device 1 are transmitted tunneled and unpacked by the foreign agents 6A.

The gateway 6 of the access network 4 is connected by an interface 7 to a computer 8 of an intermediate network 9. The computer 8 contains a DHCP server 8A, a home agent 8B and an AAA proxy server 8C. The home agent 8B is the representative of the mobile end device 1 if this is not located in its original home network. The home agent 8B is constantly informed about the current location of the mobile computer 1. Data packets for the mobile end device 1 are initially transmitted to the home agents and forwarded out tunneled by the home agents to the foreign agents 6A. Conversely, data packets sent out by the mobile end device 1 can be sent directly to the particular communication partner. The data packets of the mobile end device 1 thereby contain the home address as the dispatch address. The home address has the same address prefix, i.e. network address and subnet address, as the home agent 8B. Data packets sent to the home address of the mobile end device 1 are intercepted by the home agent 8B and transmitted tunneled by the home agents 8B to the care-of address of the mobile end device 1, and finally received at the endpoint of the tunnel, i.e. by the foreign agent 6A or the mobile end device itself.

The gateway 6 of the access network 4 is connected to a computer 8 of an intermediate network 9 by way of an interface 7. The computer 8 contains a DHCP server 8A, a home agent 8B and an AAA proxy server 8C. The home agent 8B is the representative of the mobile end device 1 if the latter is not located in its original home network. The home agent 8B is constantly informed about the current location of the mobile computer 1. Data packets for the mobile end device 1 are initially transmitted to the home agents and forwarded out tunneled by the home agents to the foreign agents 6A. Conversely, data packets which are sent out by the mobile end device 1 can be sent directly to the communication partner in question. The data packets of the mobile end device 1 thereby contain the home address as the sender address. The home address has the same address prefix, i.e. network address and subnet address, as the home agent 8B. Data packets sent to the home address of the mobile end device 1 are intercepted by the home agent 8 and transmitted tunneled by the home agent 8B to the care-of address of the mobile end device 1, and finally received at the end point of the tunnel, i.e. by the foreign agent 6A or the mobile end device itself.

The computer 8 of the intermediate network 9 is connected to an authentication server 11 of a home network 12 by a further interface 10. The home network concerns a 3GPP network for UMTS, for example. In an alternative embodiment, the server 11 is an authentication server of a WLAN network. The authentication server 11 depicted in FIG. 5 does not support MIP registration.

As soon as the AAA proxy server 8C of the computer 8 recognizes that the AAA server 11 of the home network 12 does not support MIP (CMIP/PMIP), there takes place the preparation of a mobility key for cryptographic securing of mobility signaling messages for the home agent 8B as per the method according to the invention. The AAA proxy server 8B recognizes that CMIP/PMIP support is lacking by, for example, the fact that no MIP attributes are delivered to it by the server 11 of the home network 12 on its request. A common mobility key (MIP key) for the home agent 8B and the mobile end device 1 for the PMIP downstream, or rather a common mobility key for the home agent 8B and a PMIP client 6B for the PMIP downstream, is required for cryptographic securing of mobility signaling messages. If the home network 12 is capable of WiMax interworking then the home agent 8B obtains this MIP key from the AAA server of the home network 12. If, however, the AAA server 11 is not in a position to provide the required MIP attributes upon the corresponding request of the home agent 8B, as is depicted in FIG. 5, then the method according to the invention is activated. The 3GPP-AAA server 11, as it is depicted in FIG. 5, cannot provide a corresponding cryptographic key to secure mobility signaling messages, as it cannot interpret the request of the home agent 8B. In the method according to the invention, the non-WiMax-capable authentication server 11 of the home network 12 is left unchanged and the mobility key is provided to the home agent 8B by the AAA proxy server 8C. After it has been recognized that the authentication server 11 of the home network 12 does not provide a mobility key, a so-called proxy home MIP functionality is activated and a local dataset from the authentication proxy server 8C is applied for this AAA session. The functionality required for PMIP/CMIP is, therefore, not provided in accordance with the invention by the authentication server 11 of the home network 12, but rather by the AAA proxy server of the intermediate network 9 which is located in the communication path between the authentication server 11 of the 3GPP network and the gateway 6 of the access network 4.

FIG. 6 shows a flowchart for the authentication of a mobile end device 1 in an embodiment of the method according to the invention.

After a starting step S0, in step S1 a radio connection is first established between the mobile end device 1 and a base station 3 of the access network 4 in the step S1. In step S2 authentication messages are subsequently forwarded between the access network 4 and the home network 12 by the authentication proxy server 8C of the intermediate network 9. The authentication messages contain a subscriber identity for the identification of the particular mobile end device 1. The subscriber identity is, for example, a network access identifier NAI. Alternatively, the subscriber identity is formed by a home address of the mobile end device 1, for example. The authentication messages forwarded the AAA proxy server 8C reach the authentication server 11 of the home network 12. The authentication server 11 of the home network 12 then undertakes authentication of the subscriber. If the authentication is successful, then the authentication server 11 sends a corresponding message via the authentication proxy server 8C of the intermediate network 9 to the access network 4. In step S3 the authentication proxy server 8C checks in the intermediate network 9 whether the authentication by the authentication server 11 of the home network 12 has been successfully concluded. It recognizes this in a corresponding success message of the authentication server 11, for example. If the authentication proxy server 8C recognizes, on the basis of the messages transmitted from the home network 12 to the access network 4, that the authentication of a subscriber has been successfully concluded, then the corresponding subscriber identity is extracted and buffered by the authentication proxy server 8C in step S4.

The sequence ends in step S5. Hence the AAA proxy server 8C saves all subscriber identities of subscribers, or rather mobile end devices 1, whose authentication has been successfully concluded.

As can be recognized from FIG. 7, if, after a starting step S6, the home agent 8B receives a registration request message at a later point in time, then in step S8 the home agent 8B sends a corresponding key request message to its authentication proxy server 8C. The subscriber identity of a mobile end device 1 is contained in the registration request message received. The corresponding key request message of the home agent 8c to the authentication proxy server 8C thereupon generated likewise contains the subscriber identity. The authentication proxy server 8C checks in step S9 whether the subscriber identity contained in the key request message is consistent with one of the subscriber identities saved by it in step S4. Inasmuch as this is the case, the authentication proxy server 8C provides a mobility key for cryptographic securing of mobility securing messages in step S10. The authentication proxy server 8C transmits the prepared mobility key to the home agent 8B. The mobility key is preferably also transmitted to an authentication client server 6D of the access network 4. The sequence ends in step S11.

The mobility key prepared in step S10 is randomly generated by the authentication proxy server 8C in a first embodiment of the method according to the invention.

In an alternative embodiment, the mobility key (MIP key) is derived by the authentication proxy server 8C from an MSK key (Master Session Key) which the authentication proxy server 8C has forwarded from the authentication server 11 to the access network 4. The MIP key can thereby be derived from the MSK key according to a key derivation function of the user's choice, for example by a hash function. The hash function reduces data of a chosen size to a so-called fingerprint. An example of such a hash function is given by SHA-1. Data of at most $2^{64}$ bits are thereby reproduced in 160 bits. An alternative hash function is MD5. MD5, like SHA-1, divides the input into blocks of 500 bits in size and generates hash values of 128 bits in size.

In an alternative embodiment, the mobility key provided is formed by a portion of the MSK key 12 received by the authentication proxy server 8C.

In a further alternative embodiment, the mobility key provided is identical to the MSK transmitted.

In embodiments, the authentication messages are transmitted as per the RADIUS or diameter protocol.

In the method according to the invention, the intermediate network 9 offers home MIP functionality, should this not be supported by the home network 12. In this way, it is also possible to enable macromobility based on MIP in home networks which do not support MIP, for example in 3GPP networks. MIP is used within the access network 4 and the intermediate network 9, in order to exemplify a handover between different access networks 4. In the MIP registration of the foreign agent 6A, the home agent 8B of the intermediate network 9 queries the mobility key of the authentication proxy server 8C belonging to it. It thereby uses the corresponding subscriber identity, i.e. for example a network access identifier NAI or the home address of the mobile end device 1. This key request message is answered locally by the authentication proxy server 8C, should a corresponding dataset be applied. In order that the authentication proxy server 8C can make the particular key available, it is set out in such a way that it interprets the messages exchanged between the authentication server 11 of the home network 12 and an authenticator in the access network 4 during the authentication of the mobile end device 1.

The home agent 8B is preferably located in the intermediate network 9, as is depicted in FIG. 5. In an alternative embodiment, the home agent 8B is located in the home network 12.

In an alternative embodiment of the method according to the invention, mobile IPV6 [RFC3775] is used as mobile IP functionality.

In an embodiment of the method according to the invention, the mobility key is only queried by the home agent 8B once by a key request message from the authentication proxy server 8C.

With the method according to the invention, the use of legacy AAA servers, like WLAN or 3GPPP servers for WiMax networks for example, is made possible, although these servers do not provide the CMIP/PMIP functionality expected by the WiMax networks. A PMIP-based macromobility is possible with this method according to the invention, despite the use of legacy AAA servers in the home network 12. In general, a network operator of a WLAN or 3GPP network must therefore not support PMIP itself, and can nevertheless make roaming/interworking with WiMax radio networks possible for its clients. With the method according to the invention it is particularly important, with PMIP support, to allow even end devices without the support of mobile IP WiMax interworking. In particular, the method according to the invention makes possible a WiMax-3GPP-interworking analogous to the currently specified WLAN direct IP access.

Figure 4:
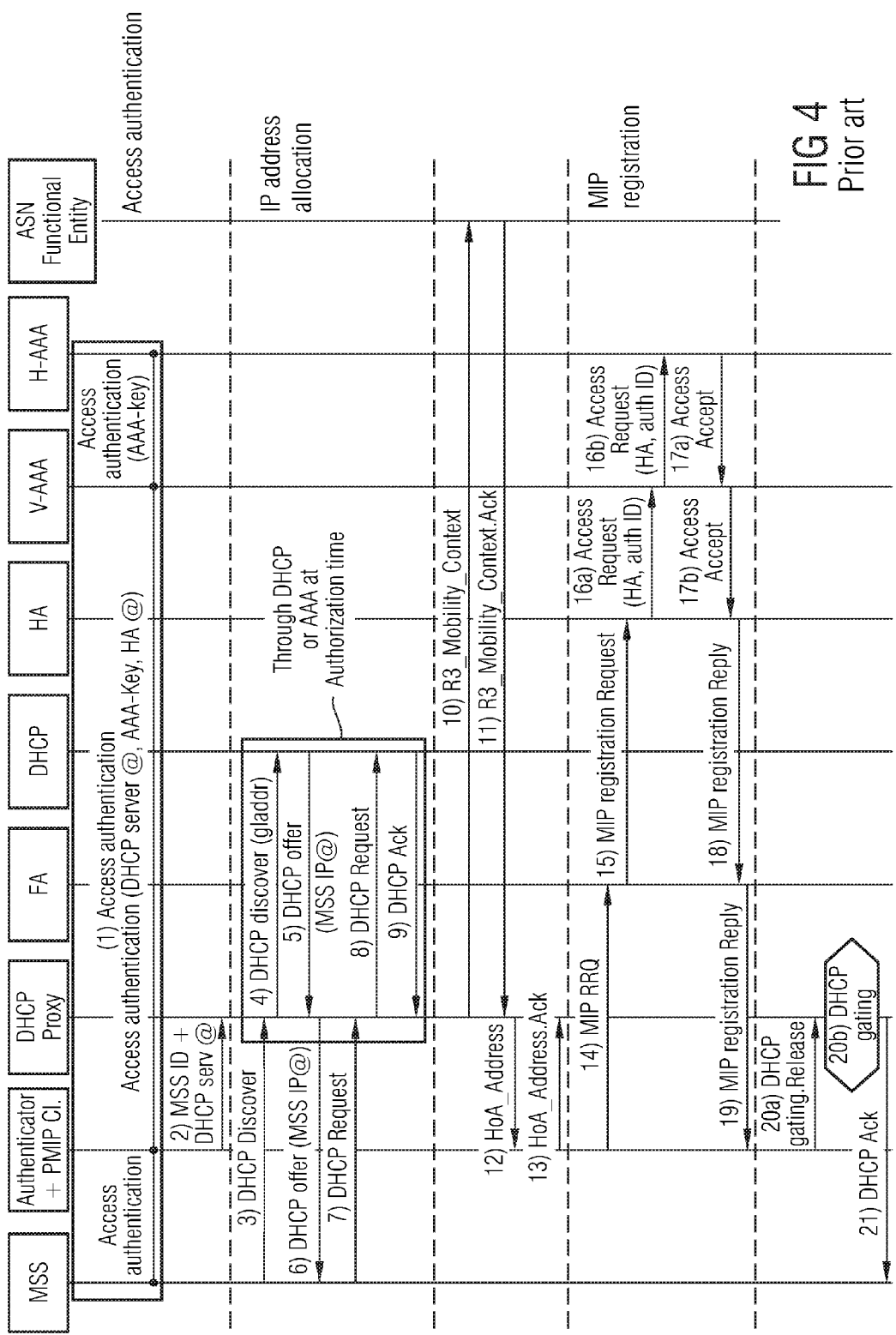
FIG. 4 is signaling diagram of a connection establishment in a known WiMax network according to the related art.

FIG. 8 shows a message flow chart of an embodiment of the method according to the invention. If no home agent address is delivered during the access authentication of the home network authentication server, for example a 3GPP network, then the authentication server of the visited network applies the home address for the home agent of the intermediate network and applies a status for the later query of the mobility key by the home agent 8B of the intermediate network. The status data contain a subscriber identity. The steps 16b, 17a depicted in FIG. 4, i.e. the query of the mobility key by the home agent 8B to the authentication server 11 of the home network 12 and the response thereto are dispensed with in the method according to the invention. The key request message containing the subscriber identity is answered in the method according to the invention by the authentication proxy server 8C of the intermediate network 9. Hence the method according to the invention enables macromobility management in WiMax networks without home network support.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3 d870, 69 USPQ2d 1865 (Fed. Cir. 2004).

The invention claimed is:

1. A method for preparation of at least one mobility key for cryptographic securing of mobility signaling messages for a home agent, comprising:

establishing a radio connection between a mobile subscriber end device and an access network, by an authentication proxy server of an intermediate network forwarding at least one authentication message, containing an authenticating subscriber identity, between the access network and a home network of a subscriber to authenticate the subscriber, and saving the authenticating subscriber identity, by the authentication proxy server, upon successful authentication by an authentication server of the home network;

receiving, by the home agent, a registration request message originating from a registering subscriber end device and containing a registering subscriber identity;

sending a key request message for a mobility key from the home agent to the authentication proxy server, with the key request message containing the registering subscriber identity; and deriving the mobility key by the authentication proxy server for the home agent when determining that the registering subscriber identity is consistent with a stored subscriber identity saved by the authentication proxy server in accordance with said establishing the radio connection, where the authentication proxy server determines whether the authentication server is lacking mobile IP support.

2. The method as claimed in claim 1, further comprising generating the mobility key at random by the authentication proxy server.

3. The method as claimed in claim 1, further comprising transmitting, by the authentication server of the home network upon successful authentication, a master session key in an authentication message via the authentication proxy server to an authentication client of the access network.

4. The method as claimed in claim 3, further comprising deriving the mobility key from the master session key by the authentication proxy server.

5. The method as claimed in claim 4, wherein the mobility key forms part of the master session key.

6. The method as claimed in claim 4, wherein the mobility key is identical to the master session key.

7. The method as claimed in claim 4, wherein said deriving of the mobility key uses at least one of a cryptographic key derivation function and a cryptographic hash function.

8. The method as claimed in claim 1, wherein the forwarding of the authentication messages is in accordance with a radius data transmission protocol.

9. The method as claimed in claim 1, wherein the forwarding of the authentication messages is in accordance with a diameter data transmission protocol.

10. The method as claimed in claim 1, wherein the access network is formed by a WIMAX access network.

11. The method as claimed in claim 1, wherein the intermediate network is formed by a WIMAX intermediate network.

12. The method as claimed in claim 1, wherein the home network is formed by 3GPP network.

13. The method as claimed in claim 1, wherein the home network is formed by a WLAN network.

14. The method as claimed in claim 1, wherein the subscriber identity is formed by a network access identifier.

15. The method as claimed in claim 1, wherein the subscriber identity is formed by a home address of the subscriber.

16. The method as claimed in claim 1, further comprising additionally providing the mobility key to a proxy mobile Internet protocol client of the access network.

17. The method as claimed in claim 1, wherein several intermediate networks are located between the access network and the home network.

18. The method as claimed in claim 17, wherein the home agent is provided in the home network or in one of the intermediate networks.

19. The method as claimed in claim 17, wherein the authentication proxy server is provided in the home network or in one of the intermediate networks.

20. An authentication proxy server for provision of a mobility key for cryptographic securing of mobility signaling messages of a home agent, comprising:
a storage unit; and
at least one programmed processor, coupled to said storage unit having a program to execute an operation including saving by the authentication proxy server provided to an intermediate network, after successful authentication of a subscriber, a subscriber identity in said storage unit and, after reception of a key request message for a mobility key from the home agent to the authentication proxy server, with the key request message containing a registering subscriber identity, deriving the mobility key by the authentication proxy server for the home agent when determining that a subscriber identity contained in the key request message is already stored in said storage unit upon successful authentication by an authentication server of a home network in accordance with an established radio connection, and
where the authentication proxy server determines whether the authentication server is lacking mobile IP support.

21. The authentication proxy server as claimed in claim 20, wherein said at least one programmed processor further generates the mobility key at random.

22. The authentication proxy server as claimed in claim 20, wherein the authentication proxy server is connected to an authentication server of a home network.

23. The authentication proxy server as claimed in claim 22, wherein said at least one programmed processor further derives the mobility key from a master session key given by the authentication server of the home network.

24. The authentication proxy server as claimed in claim 20, wherein the home network is a 3GPP network.

25. The authentication proxy server as claimed in claim 20, wherein the home network is a WLAN network.

26. The authentication proxy server as claimed in claim 20, wherein the authentication proxy server is a WIMAX authentication proxy server.

27. The authentication proxy server as claimed in claim 20, wherein said preparing of the mobility key is subsequent to execution of said successful authentication of the subscriber.

* * * * *